UNITED STATES PATENT OFFICE.

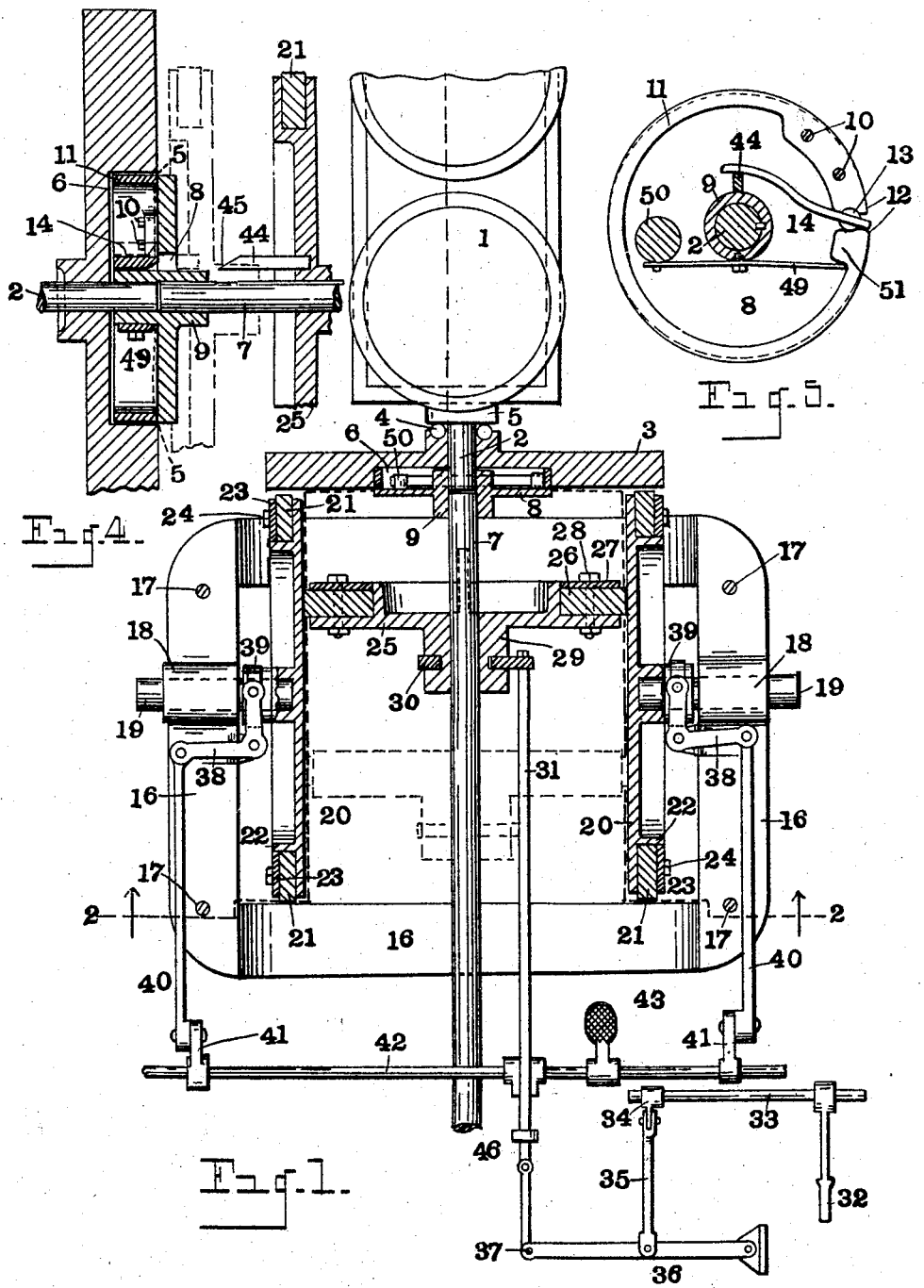

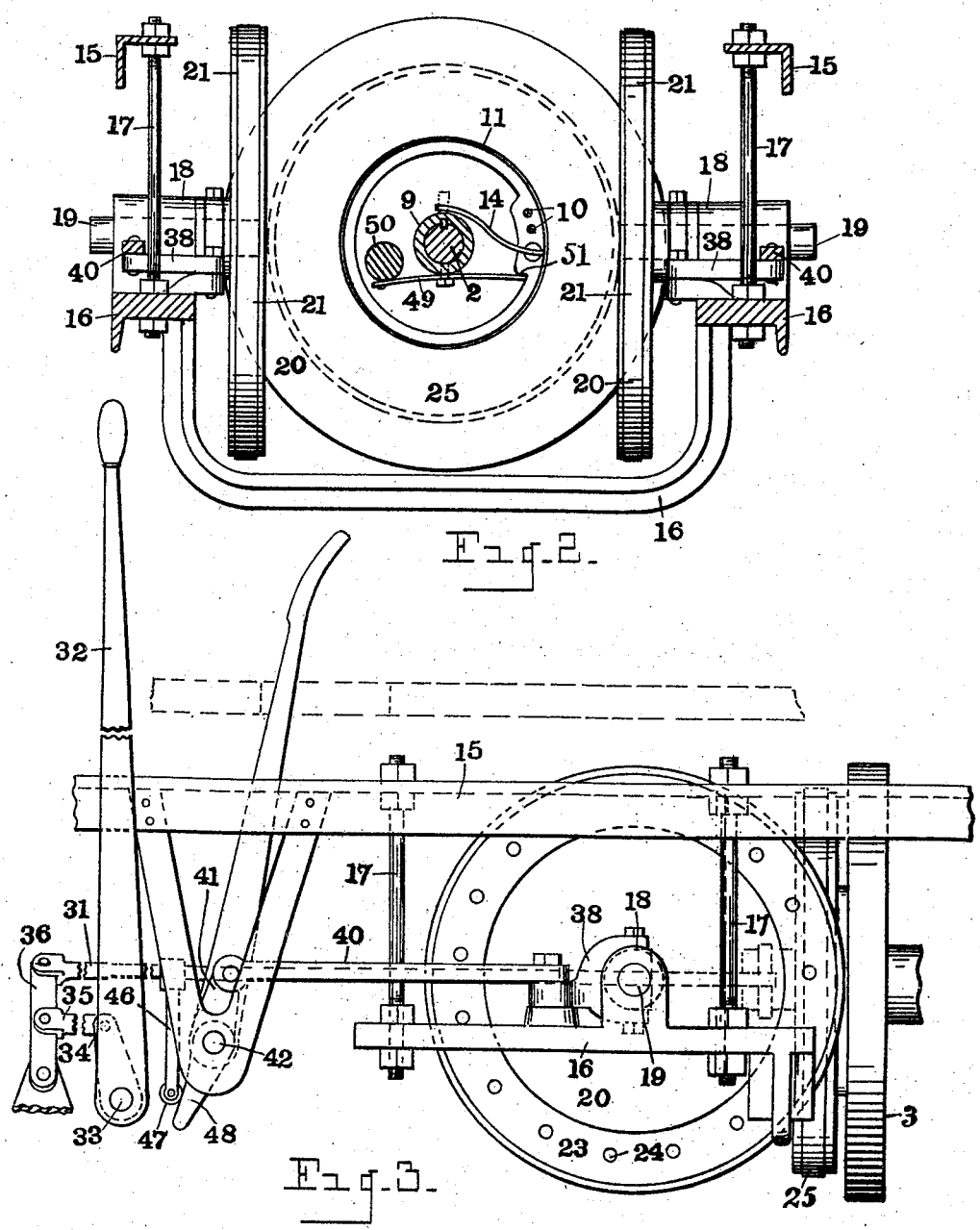

ORSON W. DAVIS, OF ADRIAN, MICHIGAN.

TRANSMISSION-GEARING.

No. 800,273.　　　Specification of Letters Patent.　　　Patented Sept. 26, 1905.

Application filed July 19, 1905. Serial No. 270,313.

*To all whom it may concern:*

Be it known that I, ORSON W. DAVIS, a citizen of the United States, residing at Adrian, in the county of Lenawee, State of Michigan, have invented certain new and useful Improvements in Transmission-Gearing; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in frictional transmission-gearing especially designed for use in connection with the propulsive mechanism of motor-vehicles; and it consists in the construction and arrangement of parts hereinafter fully set forth, and pointed out particularly in the claims.

The object of the invention is to provide simple and efficient means whereby the vehicle may be driven indirectly at varying speeds or may be driven directly through the medium of an expansible clutch-band when on the high speed, the operation of said parts being readily under control.

The above object is attained by the mechanism illustrated in the accompanying drawings, in which—

Figure 1 is a plan view of the mechanism, the transmission-gearing appearing in horizontal section. Fig. 2 is a transverse sectional view as on dotted line 2 2 of Fig. 1. Fig. 3 is a side elevation of the mechanism, parts being broken away. Fig. 4 is a fragmentary view, in vertical section, through the fly-wheel, clutch mechanism, and the slidable friction-disk carrying the projecting wedge adapted to actuate said mechanism. Fig. 5 is an enlarged sectional view as on line 5 5 of Fig. 4.

Referring to the characters of reference, 1 indicates the engine, which is of the ordinary gasolene type, having the shaft 2, upon which is mounted a fly-wheel 3, there being a thrust ball-bearing 4 between the hub of said fly-wheel and the engine-frame 5. Formed in the side of the fly-wheel, concentric to the axis of its shaft, is an annular recess 6. The driven shaft 7 stands in axial alinement with the engine-shaft, but is disconnected therefrom. Keyed to the end of said driven shaft is a disk 8, whose hub 9 extends sufficiently to loosely embrace the end of shaft 2. Bolted at 10 to the side of the disk 8 and lying within the recess of the fly-wheel is a floating expansible ring 11. Between the opposed ends 12 of said ring is journaled a pin 13, to which is fixed an inwardly-projecting lever 14, which lies between the ends of said ring and which when raised, as shown in Fig. 3, will expand the ring, so as to cause it to engage the annular wall of the recess 6 and lock the ring to the fly-wheel, thereby forming a clutch connection between said shafts, which causes them to rotate in unison and drives the machine directly at its high speed.

The side bars of the main or vehicle frame are indicated at 15. Mounted below said main frame is a supplementary frame 16, which is suspended from the main frame by means of the spring-bolts 17. Journaled in bearings 18 on the supplementary frame are the short shafts 19, which are adapted to have a slight longitudinal movement in their bearings and which carry on their inner ends the opposed friction-wheels 20, having smooth inner faces and carrying in their peripheries the frictional fiber rings 21, which embrace the lateral flanges 22, formed on said friction-wheels, and are removably secured in place by the detachable circular plates 23, held by the bolts 24. The friction-wheels 20 stand adjacent to the inner side of the fly-wheel 3, at right angles thereto, and the friction-rings 21 in the peripheries of said wheels are adapted to be carried into contact with the engine-wheel when driving the machine indirectly through the friction-gearing, as hereinafter described.

Splined upon the driven shaft 7 and interposed between the friction-wheels 20 is a friction-disk 25, having in the periphery thereof a fiber ring 26, secured in place by the clamping-ring 27 and bolts 28. When the peripheries of the friction-wheels 20 are running in contact with the face of the fly-wheel 3 and said friction-wheels are moved inwardly, so as to bring their faces into contact with the periphery of the disk 25, said disk will be rotated through said friction-wheels and a consequent rotation imparted to shaft 7. Embracing the hub 29 of the friction-disk, and in which said hub is adapted to rotate, is a collar 30, to which is connected one end of a rod 31, through the operation of which the disk 25 may be moved upon the shaft 7 to vary the speed thereof when driven through the friction-wheels 20. The speed of shaft 7 may be increased by moving said disk forwardly from the center of said friction-wheels, and the motion of the shaft is reversed when said disk is moved rearwardly past the center of the friction-wheels, as shown by dotted lines in Fig. 1. The rod 31 is actuated to slide the disk 25 through the medium of a hand-lever 32, mounted on a rock-shaft 33, carrying an arm 34, which is pivotally connected by a link 35 with a lever 36, whose free end is pivotally coupled at 37 to the rod 31, whereby by a movement of said hand-lever the rod 31 is reciprocated longitudinally and the disk 25 caused to slide upon the shaft 7.

The movement of the friction-wheels 20 is accomplished through the medium of the bell-crank levers 38, which are pivoted on the frame 16, their inner ends being pivotally coupled to the collars 39, which loosely embrace the hubs of the wheels 20 and in which said hubs rotate. Connected with the outer ends of the bell-crank levers are the rods 40, which are in turn pivotally coupled to the short arms 41 on the rock-shaft 42, carrying the foot-treadle 43. By pressing forward on the foot-treadle the bell-crank levers will be actuated to throw the friction-wheels inwardly against the periphery of the friction-disk 25. A further pressure upon the foot-treadle will spring the hanger-bolts 17 sufficiently to allow the frame 16 to swing forwardly such distance as to carry the peripheries of the wheels 20 into frictional contact with the vertical face of the fly-wheel 3, whereby said wheels will be driven from said fly-wheel in opposite directions, imparting rotation to the interposed friction-disk 25, which by the operation of the lever 32 may be moved across the faces of said wheels to vary the speed as desired.

When it is desired to expand the band-clutch, so as to drive the shaft 7 directly from the engine-shaft, the lever 32 is thrown forward such distance as to cause the beveled spud 44, carried by and projecting from the web of the disk 25, to engage the lever 14 through the opening 45 in the disk 8, whereby said lever is raised to expand the band or ring 11 and set the clutch, thereby connecting shaft 7 directly to the engine-shaft. As the rod 31 moves forward in this operation the depending arm 46 thereon, carrying the anti-friction-roller 47, engages the downwardly-extending inclined arm 48 on the rock-shaft 42, thereby actuating said shaft to draw upon the rods 40 and operate the bell-crank levers 38 to withdraw the friction-wheels 20 from engagement with the friction-disk 25, leaving said disk free to turn with the shaft 7. When the parts are in the position for driving the shaft 7 directly, as just described, and it is desired to change to the indirect drive through the friction-gears, the application of a forward pressure to the foot-treadle 43 will rock shaft 42, so as to cause the arm 48 thereon to engage the lower end of arm 46 on rod 31 and draw said rod rearwardly, so as to disengage the band-clutch 11 and permit shaft 7 to be driven through the friction-wheels 20, said operation being coincident with the movement of the bell-crank levers, which carries said wheels into engagement with the friction-disk 25 preliminary to the movement which carries the peripheries of the wheels 20 into engagement with the vertical face of the fly-wheel 3. Upon releasing the pressure against the foot-treadle the spring of the rods 17 will carry the frame 16 rearwardly sufficiently to free the peripheries of the wheels 20 from engagement with the face of the fly-wheel 3 and allow the engine to run idle.

In order to provide for quickly opening the expansible ring 11 upon the release of the lever 14, a spring 49 is employed, which is mounted upon the hub 9 and the stud 50 of the disk 8 and whose free end engages the shoulder 51 of said ring, thereby forcing the ring to collapse when the spud 44 is withdrawn from engagement therewith.

Having thus fully set forth my invention, what I claim as new, and desire to secure by Letters Patent, is—

1. In a frictional transmission-gearing, the combination of the engine-shaft, a fly-wheel fixed thereon, having a straight face, the driven shaft in line with and rotatable independently of the engine-shaft, a band-clutch to directly connect the driven shaft with the engine-shaft, a friction-disk slidable on the driven shaft and rotatable therewith, opposed friction-wheels having straight faces adapted to engage the periphery of the friction-disk, and having straight peripheries adapted to engage the straight face of the fly-wheel.

2. In a frictional transmission-gearing, the combination with the engine-shaft, the driven shaft rotatable independently thereof, a clutch mechanism for directly connecting said shafts, a friction-disk slidable upon the driven shaft and rotatable therewith, opposed friction-wheels movable into contact with the periphery of said disk, and into contact with the face of the fly-wheel, means for moving the friction-wheels into contact with the friction-disk and simultaneously releasing said clutch, and means for engaging said clutch and simultaneously moving the friction-wheels from contact with the periphery of the friction-disk.

3. In a transmission-gearing, the combination with the engine-shaft, a fly-wheel thereon, having a central annular recess, the driven shaft in line with the engine-shaft and rotatable independently thereof, an expansible clutch-ring carried by the driven shaft adapted to engage the wall of the recess in the fly-wheel to connect said shafts and cause them to rotate in unison, a friction-disk slidably mounted on the driven shaft and rotatable therewith, means for sliding said disk, opposed friction-wheels having straight faces adapted to engage the periphery of the friction-disk and having frictional peripheries adapted to engage the straight face of the fly-wheel, means for moving said friction-wheels into engagement with the periphery of the friction-disk, and means for carrying the peripheries of said wheels into engagement with the face of the fly-wheel.

4. In a frictional transmission-gearing, the combination with the engine-shaft, the fly-wheel thereon, a driven shaft, a clutch for connecting said shafts to cause them to revolve in unison, a slidable friction-disk on the driven shaft rotatable therewith, means for sliding said disk, opposed friction-wheels having straight faces adapted to move into engagement with said frictional disk, and having frictional peripheries adapted to engage the face of the fly-wheel, a supplementary frame supporting said friction-wheels movably suspended from the main frame, and means for moving the friction-wheels to cause them to engage the friction-disk, and means for moving the supplementary frame to carry the peripheries of the friction-wheels into contact with the fly-wheel.

In testimony whereof I sign this specification in the presence of two witnesses.

ORSON W. DAVIS.

Witnesses:
W. M. BLAINE,
H. W. SISSON.